(12) United States Patent
Benner

(10) Patent No.: US 11,834,181 B2
(45) Date of Patent: Dec. 5, 2023

(54) AUTOMATIC AERIAL SHIPPING SYSTEM

(71) Applicant: ARROWTEC GMBH, Berlin (DE)

(72) Inventor: Josua Benner, Berlin (DE)

( * ) Notice: Subject to any disclaimer, the term of this patent is extended or adjusted under 35 U.S.C. 154(b) by 167 days.

(21) Appl. No.: 17/421,393

(22) PCT Filed: Jan. 10, 2020

(86) PCT No.: PCT/EP2020/050575
§ 371 (c)(1),
(2) Date: Jul. 8, 2021

(87) PCT Pub. No.: WO2020/144348
PCT Pub. Date: Jul. 16, 2020

(65) Prior Publication Data
US 2022/0017222 A1    Jan. 20, 2022

(30) Foreign Application Priority Data

Jan. 10, 2019    (EP) ..................................... 19151263

(51) Int. Cl.
*B64D 1/12*    (2006.01)
*B64C 39/02*    (2023.01)
(Continued)

(52) U.S. Cl.
CPC .............. *B64D 1/12* (2013.01); *B64C 39/024* (2013.01); *B64U 50/34* (2023.01); *B64U 70/00* (2023.01);
(Continued)

(58) Field of Classification Search
CPC ................. B64D 1/12; B64C 39/024
(Continued)

(56) References Cited

U.S. PATENT DOCUMENTS 10,807,714 B2 * 10/2020 Atchley ................. B64C 39/024
11,156,010 B1 * 10/2021 Corban .................. E04H 1/1205
(Continued)

FOREIGN PATENT DOCUMENTS

CN          106184757       12/2016
EP          3372500         9/2018

*Primary Examiner* — Peter D Nolan
*Assistant Examiner* — Luke Huynh
(74) *Attorney, Agent, or Firm* — JMB DAVIS BEN-DAVID

(57) ABSTRACT

The invention relates to an automatic payload shipment system (1) for an unmanned aerial vehicle (UAV, 3) comprising: a) an unmanned aerial vehicle (UAV, 3), b) at least one payload container (2) being configured to be automatically releasably attachable to the unmanned aerial vehicle (3), wherein the payload container (2) has a container wall (22) enclosing a container volume (22*c*) for goods (21) or a person, and wherein the container wall (22) comprises an energy storage (10) for providing the unmanned aerial vehicle with energy, c) a landing platform (4) for the unmanned aerial vehicle (3), the landing platform (4) comprising an elevated landing area (41) accessible by the unmanned aerial vehicle (3) from the air, a support post (8) supporting the landing area (41), the support post (8) extending upwards from the ground (101) for providing an elevation for the landing area (41), a transport system (6) for automatically transporting the payload container (2) from the landing area (41) to a terminal position (71) at a terminal (7) comprised by the post (8), wherein the terminal (7) is arranged such in the support post (8) that a person on the ground (101) can access the payload container (2) in the terminal position (71) from ground level (101). The invention further relates to a method for automatic and autonomous shipping of payloads with the system (1).

15 Claims, 3 Drawing Sheets

(51) Int. Cl.
*B64U 50/34* (2023.01)
*B64U 70/00* (2023.01)
*B64U 101/60* (2023.01)

(52) U.S. Cl.
CPC ...... *B64U 2101/60* (2023.01); *B64U 2201/10* (2023.01)

(58) Field of Classification Search
USPC ............................................................ 701/3
See application file for complete search history.

(56) References Cited

U.S. PATENT DOCUMENTS

| | | |
|---|---|---|
| 2014/0032034 A1 | 1/2014 | Raptopoulos |
| 2015/0158587 A1* | 6/2015 | Patrick ..................... B64D 1/12 701/3 |
| 2016/0362187 A1* | 12/2016 | Armstrong .............. B60L 50/10 |
| 2018/0141682 A1 | 5/2018 | Blake |
| 2018/0265098 A1 | 9/2018 | Evans |
| 2018/0362187 A1 | 12/2018 | Pruski |
| 2019/0012640 A1* | 1/2019 | Ferguson .............. B64C 39/024 |
| 2019/0114578 A1* | 4/2019 | Afordakos ....... G06Q 10/08355 |
| 2019/0147751 A1* | 5/2019 | Sasao .................. G08G 5/0091 701/3 |

* cited by examiner

AUTOMATIC AERIAL SHIPPING SYSTEM

CROSS-REFERENCE TO RELATED APPLICATIONS

This is the U.S. National Stage of International Patent Application No. PCT/EP2020/050575 filed on Jan. 10, 2020, which in turn claims the benefit of European Patent Application No. 19151263.1 filed on Jan. 10, 2019.

The invention relates to an automatic payload shipment system with an unmanned aerial vehicle (UAV) and an automatically operated landing platform.

Unmanned aerial vehicles are used in several applications known in the state-of-the-art. For example, unmanned aerial vehicles can be used for photography and film, in agricultural monitoring and even transport of persons.

The term unmanned aerial vehicle particularly refers to an aerial vehicle that either is flying completely autonomous or that is controlled by a pilot that is not flying together with said vehicle, but can be located stationary on ground.

In case the unmanned vehicle is flying completely or semi-autonomous, the unmanned aerial vehicle is computer-programmed and will find its way by means of dedicated positioning systems and/or avoid obstacles by means of a dedicated sensor system.

Unmanned aerial vehicles for transporting payloads particularly in the context of shipment and delivery logistics deliver are known for example from DE102008014853B4. DE102008014853B4 teaches a specifically designed unmanned multi-copter for transport of packages, wherein the multi-copter has a frame for the rotors that essentially extends V-shaped along a direction of flight such that field of view is provided.

U.S. Ser. No. 14/975,618 teaches a beehive-like structure for aerial package delivery with unmanned vehicles. However, due to the size and its geometry of these structures, these structures require a comparably large amount of ground space, such that they are not well-suited for dense urban areas, but rather for remote rural locations.

Therefore, particularly in urban areas one challenge is to install appropriate landing platforms and deliver systems for unmanned aerial vehicles.

An object of the invention is therefore to provide a system and a method that are well-adapted to the transport and delivery of payloads in urban areas.

This object is achieved by an automatic payload shipment system for an unmanned aerial vehicle according to claim 1, and a method for shipping and delivery of a payload with an unmanned aerial vehicle.

Advantageous embodiments are described in the subclaims.

According to claim 1 an automatic payload shipment system for an unmanned aerial vehicle comprises at least the following components:
a) an unmanned aerial vehicle (UAV),
b) at least one payload container being configured to be automatically and releasably attachable to and detachable from the unmanned aerial vehicle, wherein the payload container has a particularly rigid and/or waterproof container wall enclosing a container volume for transport of goods or a person, and wherein the container wall comprises an energy storage for providing the unmanned aerial vehicle with energy, particularly wherein the energy storage comprises a rechargeable battery or a fuel fluid, such as Hydrogen or Methanol, particularly wherein the payload container is configured to be transported and released or received by the unmanned aerial vehicle on a landing platform,
c) the landing platform for the unmanned aerial vehicle comprising
an elevated landing area accessible by the unmanned aerial vehicle from the air,
a support post supporting the landing area, the post extending essentially vertically from the ground,
a transport system for automatically transporting the payload container from the landing area to a terminal position at a terminal comprised by the support post, wherein the terminal is arranged such in the post that a person on the ground can access the payload container in the terminal position from ground level.

An unmanned aerial vehicle, commonly referred to as UAV, is particularly a multi-copter with at least four or more rotors. In order to have a fail-safe redundancy and more lifting power the unmanned aerial vehicle particularly comprises more than four rotors, for example 8, 12 or even more rotors. The unmanned aerial vehicle can also be a vertical take-off and landing (VTOL-) UAV.

The unmanned aerial vehicle can be completely computer-controlled for autonomous flight and flight scheduling.

According to one embodiment the unmanned aerial vehicle is an autonomous unmanned aerial vehicle that is configured to autonomously determine a route between a starting position and a landing position.

For that purpose the unmanned aerial vehicle can be programmed accordingly with the starting and landing position. The programming can be done in the remote controlled fashion by an operator or customer.

The system further comprises a payload container that can be automatically and releasably attached to or detached from the unmanned aerial vehicle.

The term "automatically" in the context of the specification particularly refers to a kind of operation that is performed without intervention of a person.

The term "autonomous" in the context of the specification particularly refers to an independent mode of operation that particularly plans and schedules operating steps such as flight route, charging times, loading and unloading without the need of supervision of a person.

The terms "ground" and "ground level" particularly refer to the structure on which landing platform, particularly the support post, are founded.

Thus, the ground or the ground level can for example be a roof of a building, a street or a bridge.

According to one embodiment, the payload container is attached from below of the unmanned aerial vehicle that is at a ground-facing side of the unmanned aerial vehicle.

According to another embodiment, the payload container has an opening arranged on a top side of the container that faces towards the ground-facing side of the unmanned aerial vehicle, such that if the container is attached to the unmanned aerial vehicle said opening is covered by the unmanned aerial vehicle.

The container is configured to be automatically releasably attachable to the unmanned aerial vehicle and the container comprises means to facilitate docking and undocking.

Such means can comprise a locking or a latching mechanism.

As the container comprises an energy source for providing the unmanned aerial vehicle with energy needed for flight, the payload container serves as an energy source for the unmanned aerial vehicle.

Therefore, the container comprises means for delivering the energy to the unmanned aerial vehicle.

This way, each time a container is exchanged, the unmanned aerial vehicle can be provided with a charged energy source, allowing immediate take-off for its next mission.

The unmanned aerial vehicle can comprise its own energy source in order to maintain basic functions such as operating the docking and undocking mechanism for the payload container and for sustaining basic radio communication for example with the landing platform.

According to another embodiment of the invention, the system comprises a plurality of payload containers that can be interchanged with the unmanned aerial vehicle using the same locking or latching mechanism.

This embodiment allows for exchanging payload containers rapidly. Moreover, a preloading of the container with the respective payload can take place while the unmanned aerial vehicle is still underway. This way a minimum turn-over time of the unmanned aerial vehicle is achieved.

The container volume can come in various sizes. The container volume can be so small that no persons but only packages and postal goods fit in the container volume. The container volume can be in the range of 0.001 $m^3$ to 1 $m^3$.

Alternatively, the container can be a cabin designed and suited to house at least one person.

According to the invention the energy source is arranged in the container wall around the container volume.

According to another embodiment, the container wall extends only laterally around the container volume and particularly does not comprise the container bottom.

According to another embodiment of the invention, the container wall comprises an inner container wall that encloses the container volume and an outer container wall that faces towards an outside of the payload container.

According to another embodiment of the invention, the energy source is arranged between the inner container wall and the outer container wall.

According to another embodiment of the invention, the energy source is integrally, connected to the payload container, particularly such that the energy source cannot be separated form the payload container without compromising the payload containers integrity, particularly without destruction.

The container wall particularly comprises the container bottom. The container bottom is particularly the part of the container that faces the ground, when the container is in its operating state. The energy source can also extend in the bottom.

Alternatively, the energy source is completely comprised in the bottom of the container.

The landing platform is particularly designed to receive only one unmanned aerial vehicle at a time.

According to the invention the landing area is elevated with respect to its surrounding ground.

The landing area is arranged such on the landing platform that the unmanned aerial vehicle can land or take-off vertically. The landing area is particularly planar and extends horizontally.

The landing platform comprises the support post supporting the landing area. The landing area can be support by a single support post only or a plurality of support posts.

The support post extends essentially vertically from the surrounding ground, e.g. from the street the landing platform is arranged at, a roof or sea level.

This allows the unmanned aerial vehicle to land and take-off without interfering with the traffic and infrastructure on the ground.

The term "ground" in the context of the specification particularly refers to the ground on which the landing platform is arranged, i.e. from where the support post extends.

Therefore, the ground can also be a roof top or sea level.

The support post allows for an elevated position of the landed unmanned aerial vehicle that in turn provides a better reception for example for global and local positioning system and the like.

The elevated position of the landed unmanned aerial vehicle on the landing area also provides an inherent thief protection of the unmanned aerial vehicle and the payload container and thus the payload.

In order to deliver a payload in a container brought by the unmanned aerial vehicle, the system comprises the transport system, particularly comprised on an inside of the support post—another aspect that contributes to a built-in thief protection.

The transport system is configured to transport the container from the landing area to the terminal position and vice versa and allows for an automatic and autonomous operation of the system according to the invention.

The transport system particularly comprises an elevator configured to transport the container from the landing area to the terminal.

For example, in a first step the unmanned aerial vehicle with a payload container comprising a payload lands on the landing area of the landing platform. Then, the transport system engages with the container that is released by the unmanned aerial vehicle. The transport system subsequently transports the container to the terminal position such that the payload inside of the container is accessible by the recipient or customer who stands at ground level.

For this purpose at least one opening of the container is presented to the recipient or customer at the terminal position.

The terminal is particularly designed such that the container cannot be removed from the terminal, but only the goods inside the container.

According to another embodiment of the invention, the system comprises a plurality of unmanned aerial vehicles.

According to another embodiment of the invention, the landing platform comprises an elevated storage unit particularly arranged below the landing area for storing a plurality of payload containers, wherein the storage unit is supported by the support post and particularly arranged on a top end of the support post, wherein the transport system is further configured to automatically transport the payload container from the landing area or the terminal position to a storage position in the storage unit, particularly wherein the storage unit has a larger circumference than the support post at ground level.

Therefore, the storage unit is particularly not comprised by the support post but arranged on top of the support post. The storage unit particularly covers a greater area above ground than the post.

The elevated storage unit allows for storing a plurality of containers and at the same time does not occupy valuable space on ground that can be used for car parking or other infrastructure.

For that purpose the storage unit particular comprises a plurality of storage positions for a plurality of containers. Each storage position is individually accessible by the transport system and a storage position for each container can be stored in a memory of the system such that it can be re-addressed at any time.

An incoming container delivered by the unmanned aerial vehicle landed on the landing area therefore can be transported by the transport system from the landing area to the storage unit. There, the container can be stored until the recipient arrives at the landing platform and triggers the transport system to deliver the container comprising the payload to the terminal such that the recipient can pick up the delivery.

The storage unit is particularly covered from rain and other weather conditions such that any goods comprised in the container can be stored safely.

The storage unit has particularly a circular floor plan, wherein storage positions for the containers are distributed along the circumference of the circular floor plan, particularly wherein the support post arranged centrally.

According to this embodiment the transport system can either be configured transport the containers to the respective storage position that are particularly fixed on the fixed floor.

This embodiment allows for a transport system that is separated from the storage unit, such that transport system is easy accessible for maintenance.

Alternatively or additionally the floor of the storage unit is comprised by the transport system, wherein according to this alternative, the floor comprising the storage positions is rotatable in its floor plane, such that the storage positions move in a circular fashion, allowing the containers to be moved to a specific pick-up position in order to be further transported either to the landing area or the terminal.

According to another embodiment of the invention, the circumference of the post at ground level is less than 100 m, 16 m, particularly less than 10 m, particularly less than 6 m.

The landing area and the storage unit on top of the support post can have a larger circumference particularly forming a roof. This embodiment allows for reducing the footprint of the landing platform on ground, and thus for minimal impact on existing infrastructure on ground, such as parking space, or roof top infrastructure, such as antennas.

According to another embodiment of the invention, the ground facing side and thus the bottom of the landing area and/or the storage unit is arranged at a height above ground level so that a person cannot reach the landing area and/or storage unit when standing on ground level, particularly wherein the landing area and/or the storage unit is arranged at a height above ground level of more than 2 m, particularly more than 4 m, more particularly more than 6 m on the support post.

The elevated landing area provides also better transmission and reception of radio waves to and from the unmanned aerial vehicle.

The elevated landing area and/or storage unit allows for a car parking below the elevated landing area and/or the storage unit. The elevated landing area or storage unit provides a roof and omitting interference with the ground-based infrastructure.

According to another embodiment of the invention, the payload container comprises locking pins arranged opposite the container bottom, wherein the pins extend upwards from the container wall that is particularly away from the container bottom, wherein each pin has a lateral cutout for engaging with a locking device of the unmanned aerial vehicle, wherein the unmanned aerial vehicle comprises corresponding recesses for receiving the locking pins, wherein the vehicle further comprises a locking device that is configured to laterally engage in the lateral cut outs of the locking pins so as to fix the payload container in a predefined position to the unmanned aerial vehicle.

According to another embodiment of the invention, the locking pins extend essentially vertically upwards, particularly when the payload container is arranged for transportation with the UAV. The term "vertically" particularly refers to a direction parallel or anti-parallel to gravity.

According to another embodiment the locking pins each comprise a cutout that extends circumferentially around the locking pin.

According to another embodiment of the invention, the locking pins are formed as cylinders, wherein the cylinders each comprise a lateral cutout in form of a circumferential recess in to which a locking device of the UAV can engage.

The lateral engaging of the locking device in the locking pins allows for particularly fail-safe attachment of the container to the unmanned aerial vehicle, as gravity pulls essentially orthogonal to the engagement.

Disengagement of the container when flying is therefore omitted. The force to release the container, i.e. to retract the locking device from the lateral cutouts, is particularly reduced, when the container is supported by the landing area, particularly lifting the container locking pins slightly off the locking device, such that weight of the container on the locking device is reduced.

According to another embodiment of the invention, the energy storage comprises a rechargeable electric energy source such as a rechargeable battery for supplying the unmanned aerial vehicle with electricity for flight, or wherein the energy storage is configured to be filled with compressed or liquid hydrogen or methanol for providing energy to a fuel cell of the unmanned aerial vehicle, particularly wherein the energy source of the container is the only energy source for flight of the unmanned aerial vehicle.

According to another embodiment of the invention, at least two of the locking pins are electrically conductive and are connected to the rechargeable electric energy source of the payload container, such that the locking pins can provide electricity stored in the payload container to the unmanned aerial vehicle, when the pins are in the recesses of the unmanned aerial vehicle and particularly engaged with the locking device.

According to another embodiment of the invention, the payload container wall has a round and aerodynamic, particularly a cylindrical outer contour, for reducing drag during flight.

The cylindrical outer container walls can have a circular, an elliptical or an oval bottom area for reducing drag during flight.

It is noted that the faces of the container wall facing the container volume can have another contour, for example rectangular.

According to another embodiment of the invention, the payload container has an opening for fetching and gathering the payload, wherein when the payload container is at the terminal position at the terminal, for example, when the transport system has transported the payload container to the terminal position, the payload container volume is accessible by a customer through the opening of the container, such that the payload is insertable in the volume or receivable from the volume, wherein the container is non-removably attached to the landing platform, when the container is at the terminal position, particularly such that only a payload inside the container becomes accessible at the terminal position, while the container cannot be removed.

This embodiment discloses a system in which the containers cannot be removed from the landing platform and any goods to be delivered with the system, can be received from the terminal directly from the container.

In turn, also goods to be shipped can be posted directly at the terminal into the container.

In this way a universal and flexible shipment system is established that can reuse the container.

According to another embodiment of the invention, the opening of the container is on a top side of the container, i.e. a side of the container that is arranged opposite of the bottom of the container.

This allows having an open container that is covered during transport by the unmanned aerial vehicle and whose payload is readily accessible by a recipient or customer.

According to another embodiment of the invention, the payload container has a transport pin for engaging with a corresponding receptacle of the transport system so that the container particularly when released from the unmanned aerial vehicle can be moved by means of engagement to the transport system, when the transport pin is engaged in the receptacle.

The transport pin is particularly arranged on the bottom and extends, particularly vertically, away from the bottom, such that the transport pin does not interfere with the container volume, i.e. the pin does not reduce the container volume.

According to another embodiment of the invention, the landing area comprises a centering system for a landed unmanned aerial vehicle, wherein the centering system comprises at least two movable centering elements arranged around an opening in the landing area for receiving the payload container, wherein each centering element comprises a concave receiving portion configured to receive a leg of a landing gear of the unmanned aerial vehicle or to receive a centering protrusion of the unmanned aerial vehicle configured and designed for being received by the centering element, wherein each concave centering element faces with its concave face the opening in the landing area, and wherein each centering element is connected to a motor of the centering system configured to move the centering elements particularly differentially towards or away from the opening so as to center the unmanned aerial vehicle on the opening such that the container can be received by the transport system at the opening and transported to the respective position of the landing platform, when the unmanned aerial vehicle is centered over the opening.

The centering system allows for an autonomous, automatic and unsupervised operation of the system.

According to another embodiment of the invention, the centering system comprises three centering elements arranged in a triangle on the landing area and the unmanned aerial vehicle comprises at least three centering protrusions or legs for being received by an associated centering element.

Having three centering elements, it is possible to center the unmanned aerial vehicle independent of its landing orientation with a minimum number of centering elements.

According to another embodiment of the invention, each centering element is arranged on a corresponding guiding track on the landing area along which the corresponding centering element is movable, wherein the guiding tracks point towards the opening and extend particularly straight outward from the opening along the landing area, such that the unmanned aerial vehicle can be centered by moving the centering elements from a periphery of the landing area towards the opening.

According to another embodiment of the invention, the landing platform particularly the storage unit comprises at least one charging position, particularly a plurality of charging positons for charging the energy source of the container located at the charging position, wherein the transport system is configured to automatically move the container to the at least one charging position, wherein the charging position is configured to provide the energy source of the container with energy, such as electricity or fuel so as to charge the energy source in the container, particularly wherein the charging position can be storage position of the container.

This embodiment allows for charging, particularly electrically recharging the battery of the container, when the container is stored in the landing platform.

The charging can for example be achieved by contacts at the charging position that contact the pins of the container, when the container is transported by the transported system to the charging position that can be identical with the storage position.

This embodiment allows for an autonomous, automatic, unsupervised recharging of the energy storage and thus for an unsupervised operation of the system.

According to another embodiment of the invention, the landing platform comprises a charging device arranged and designed for providing the payload container, particularly the energy source comprised by the container at the charging position with electricity or fuel.

According to another embodiment of the invention, the payload container is a passenger cabin for a person, wherein the transport system is configured to transport the cabin to the terminal position at the terminal, wherein the terminal is configured such that a passenger can enter or leave the cabin at the terminal.

The problem according to the invention is furthermore solved by a method for aerial shipping of a payload with an unmanned aerial vehicle, comprising the steps of:
 Providing a payload container attached to an unmanned aerial vehicle;
 Landing the unmanned aerial vehicle on an automatic payload shipment system for unmanned aerial vehicles according to the invention,
 Automatically releasing the payload container,
 Automatically transporting the container to a storage unit of the system with the transport system,
 Upon request, transporting the payload container to the terminal position of the system, where the container volume is accessible by a customer, wherein the payload container is non-removably attached to the landing platform,
 Particularly automatically transporting the container to a charging position, particularly wherein said charging position is identical to a storing position in the storage unit, where the energy source of the container is particularly charged by a charging device.

Terms and definitions of the system are applicable to the method.

The method according to the invention allows for an autonomous operation of the automatic shipment system.

According to another embodiment of the invention, a payload is provided to a container at the terminal by a customer, wherein the container is subsequently automatically transported to a landed unmanned aerial vehicle on the landing platform by the transport system and wherein said payload container is automatically attached to said unmanned aerial vehicle, wherein the unmanned aerial vehicle takes off and delivers the payload to a recipient or a receiving station.

The recipient or receiving station can be another landing platform as described in the specification.

In the following the invention is illustrated by figures and by means of exemplary embodiments.

LIST OF REFERENCE SIGNS

1 System
2 payload container
21 payload
22 container wall
22a outer wall
22b inner wall
22c container volume
23 container bottom
24 transport pin
25 top side of container
26 locking pin
26a lateral cutout
26b insulating layer
26c locking device
26d electrical contact, data cable
26e electrical contact
3 unmanned aerial vehicle/multi-copter
31 landing gear
4 landing platform
41 landing area
42 opening in landing area
5 storage unit
51 storage position
52 delivery position
6 transport system
7 terminal
71 terminal position
8 support post
91 charging position
10 battery/energy source
11 centering element
12 track
100 person
101 ground level
102 car
103 circular path

EXAMPLES

Figure 1:
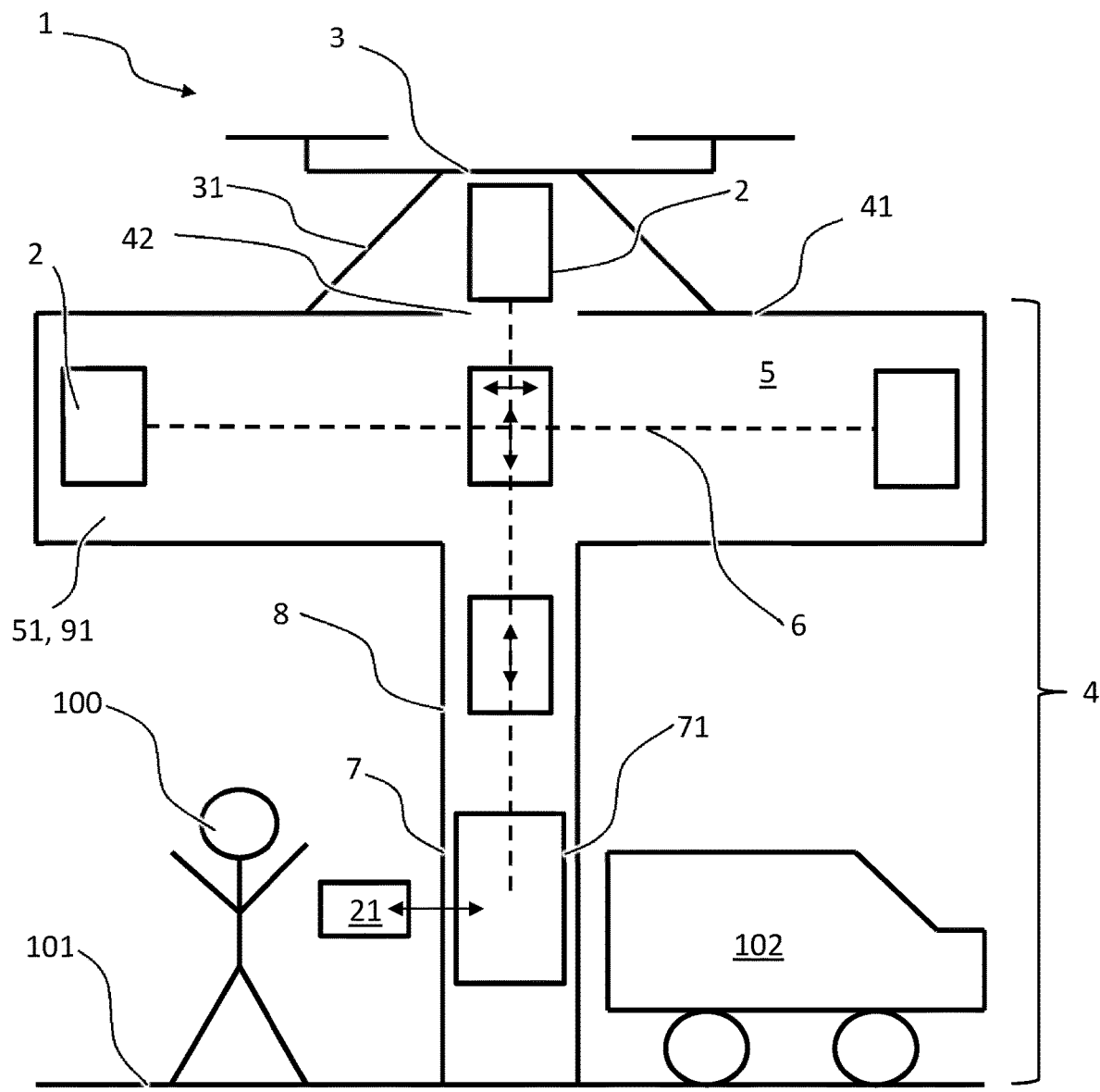
FIG. 1 shows a schematic view of an embodiment an aerial shipment system according to the invention.

In FIG. 1 a schematic view of an aerial shipment system 1 is shown. FIG. 1 depicts an unmanned aerial vehicle 3 in form of a multi-copter landed on a landing platform 4. The landing platform 4 has an even and horizontally extending landing area 41 on top, where the unmanned aerial vehicle 3 is landed and can take off. Below the landing area 41 is a storage unit 5 that is configured to store containers 2 with or without payload. For this purpose the storage unit 5 comprises a plurality of storage positions 51, where containers 2 can be stored. The storage unit 5 is waterproof and particularly inaccessible to people.

Figure 2:
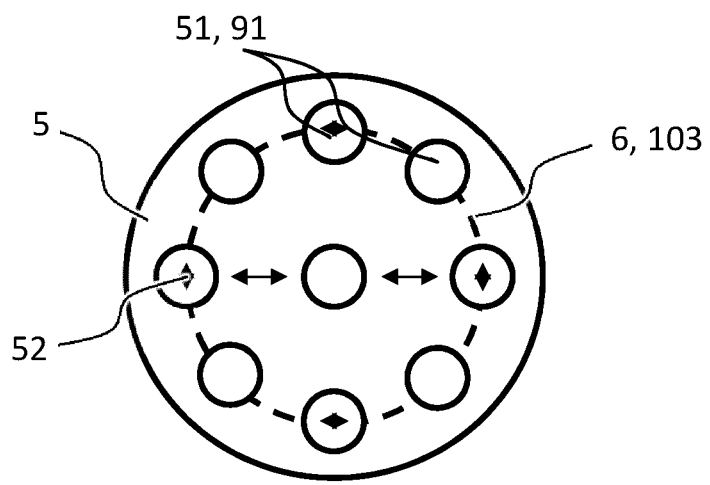
FIG. 2 depicts a schematic top view cross-section of the landing platform with an inside floor plan of the storage unit arranged under the landing area.

A more detailed description and embodiment of the storage unit 5 is shown in FIG. 2.

The storage unit 5 and the landing area 41 are arranged on the top end of a support post 8. The support post 8 extends vertically from the ground 101. The height of the support post 8 in this example is about twice the size of a person—that is approximately 4 m. The support post 8 has a transport channel within which a payload containers 2 can be transported from the landing area 41 or the storage unit 5 to a terminal 7 that is located at ground level 101 in the support post 8. The payload container 2 that is transported to the terminal 7 will be held in a terminal position 71. At the terminal position 71 the payload container volume that is enclosed by the container walls is accessible to a customer for posting or receiving a payload 21.

In order to receive the payload 21 the terminal 7 can comprise a latch or a door that opens only to authorized persons.

For example, a person expecting a shipment at that landing platform 4 will be provided with a unique code or identifier by the system for example via mobile communication or internet. Alternatively, the person is in possession of an ID that allows the system to verify that the person picking up the shipment is indeed the correct recipient.

In order to pick up the shipment, the person enters the unique code or identifier or identifies himself with the ID at the landing platform 4 more particularly at an interface close to the terminal 7.

The system 1 provided with the ID will identify the storage position 51 of the payload container 2 comprising the shipment 21 for the person. The container 2 will then be transported from the storage position 51 to the terminal position 71, where the person receives his shipment. It is noted that the container 2 is not removable from the landing platform 4 at the terminal 7 so that the containers can be reused many times.

The empty container 2 can then be transported back to a storage position 51 by the transport system 6 until a new payload is provided either at the landing platform 4 or until the container 2 is brought to a different location by the unmanned aerial vehicle 3.

In order to transport the payload container 2 from the landing area 41 to the storage position 51 and/or to the terminal 7, the system 1 comprises a transport system 6 that is configured to do so.

The landing area 41 comprises an opening 42 through which a container 2 can be transported to the inside of the storage unit 5. The opening 42 can be automatically closed by an appropriate means such that weather conditions do not affect the inside of the landing platform 4.

In order to have the system 1 operating fully automatic it is necessary that a landed unmanned aerial vehicle 3 with a payload container 2 attached to it is configured to automatically release said payload container 2 at the appropriate position on the landing area 41.

For this purpose specific wireless, radio-based communication means with the landing platform 4 can be incorporated in the system 1.

Each container 2 can be associated with a unique identifier such that a tracking of each shipment is facilitated by the system 1.

Once the container 2 is released or even prior to its release, the transport system 6 engages with said payload container 2 and transports it to the storage position 51 in the storage unit 5 or even directly to the terminal 7 in case an immediate delivery or shipment is intended.

It is obvious that the whole process of shipping and receiving of payloads can be reversed such that an empty container is provided to a customer at the terminal 7 and the customer inserts the payloads that is to be shipped to a different location. Until shipment, the payload container 2 can be stored at the storage unit 5. Once an unmanned aerial vehicle 3 for transport is available, the transport system 6 will transport the container 2 to the unmanned aerial vehicle 3, where the container 2 is attached to the unmanned aerial vehicle 3 automatically for transport.

Subsequently, the payload can be brought to another landing platform 4 or a logistic center.

As can be seen from FIG. 1 the support post 8 has a comparably small diameter and circumference, wherein the storage unit 5 and the landing area 41 have a larger circumference.

This way it is possible to install the landing platform 4 even in high density urban areas for example next to a walkway or driveway, such that cars can park below the storage unit 5. This design provides a particularly small footprint to the system 1 and a roof for the covered ground area.

In FIG. 2 a schematic top view cross-section of the landing platform 1 is shown particularly the inside floor plan of the storage unit 5 arranged under the landing area 41.

The storage unit 5 is circular and at its periphery a plurality of storage positions 51 for payload containers 2 are provided along a circular path 103. The transport system 6 can arrange or remove containers 2 from the storage positions 51. For this purpose the containers 2 can be moved along the circular path 103 to bring a specific container 2 to a certain predefined delivery position 52. From the delivery position 52 the container 2 is transported to the terminal 7 or to the landing area 41.

The transport system 6 therefore comprises a carousel-device that is configured to rotate the containers 2 between the storage positions 51 located on the periphery of the storage unit 5 and the delivery position 52. The carousel-device is either configured and designed such that the containers 2 and the storage positions 51 can be rotated at once (as sown in FIG. 2) or the carousel device has a means to pick up the containers 2 at any of the storage positions 51 and transport it further to the terminal 7 or the landing area 41. Furthermore, the transport system 6 comprises a transport device for bringing a payload container 2 to the center of the storage unit 5 from where the container 2 can be either transported upwards to the opening of the landing area 41 or downwards to the terminal position 71.

As the containers 2 in this example comprise rechargeable batteries 10 in the container walls 22 and or the container bottom 23, in one embodiment each storage position 51 in the storage unit 5 is also equipped with a charging device for charging the batteries 10 of the container 2, when the container 2 is in the storage position 51.

This allows for charging the battery 10 simultaneously to the storage of the containers 2. The batteries 10 in the containers 2 are the main energy source for flight of the unmanned vehicle 3 and are configured provide the aerial vehicle 3 with electric energy by means of an electric contact established between an attached container 2 and the unmanned aerial vehicle 3.

Figure 3A:
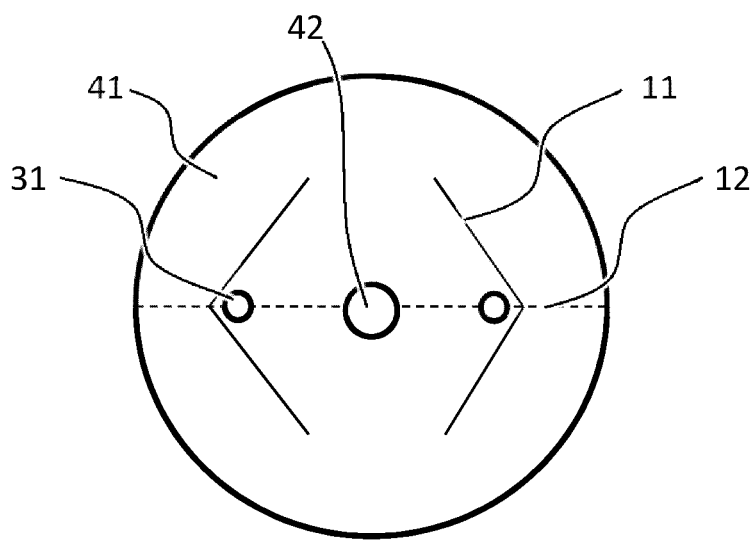
FIG. 3A depicts a schematic top view of the landing area.

In FIG. 3A a schematic top view of the landing area 41 is shown. Two concave centering elements 11 are movably arranged on the landing area 41. The centering elements 11 can be moved along a track 12 (depicted as a broken line) towards or away from the opening 42. The opening 42 is configured to receive a payload container 2.

The two small circles in FIG. 3 each depict a leg 31 of a landing gear of the unmanned aerial vehicle 3 or a centering protrusion of the unmanned aerial vehicle 3 configured and designed for being received by the centering element 11.

By moving the centering elements 11 appropriately it is possible to center an unmanned aerial vehicle 3 that landed off-center over the opening 42. Once the unmanned aerial vehicle 3 is centered over the opening 42 the container 2 can be released and received as well as transported by the transport system 6.

Vice versa, a landed unmanned aerial vehicle 3 without a container 2 has to be centered on top of the opening 42 of the landing area 41 before the container 2 can be attached to the unmanned aerial vehicle 3.

Figure 3B:
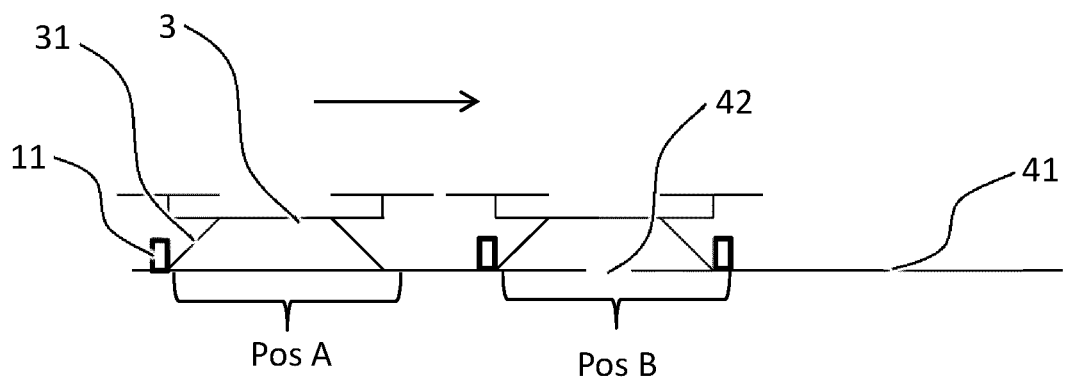
FIG. 3B schematically depicts a centering process of an unmanned vehicle landed off-center on the landing area.

The centering process is depicted in FIG. 3B. Initially (Position A) the centering elements 11 are arranged at the very periphery of the landing area 41. Once the unmanned aerial vehicle 3 has landed—here to far left of the opening 42, the left centering element 11 engages with a leg 31 of the landing gear of the unmanned aerial vehicle 3 and pushes it towards the opening 42 in the center of the landing area 41 (Position B). Due to the concave shape of the centering element 11 the unmanned aerial vehicle 3 also rotates around its axis accordingly, such that the centered unmanned aerial vehicle 3 adopts a well-defined orientation on the landing area 41. This reduces complexity of subsequent automatic processing steps of the payload container 2. Moreover, the concave shape of the centering elements 11 provides an automatic and passive catching mechanism of the landed unmanned aerial vehicle 3 such that the unmanned aerial vehicle 3 can land in any orientation or position on the landing area 41. This reduces the complexity of the landing and container transport process. The centering elements 11 move along the track 12, wherein each centering element 11 can be driven by a separate motor. Once the unmanned aerial vehicle 3 is landed that could be for example indicated to the landing platform 1 by radio communication, the centering elements 11 start moving symmetrically (at the same speed) from the periphery towards the center. Independent of the landing position and orientation of the unmanned aerial vehicle 3, the unmanned aerial vehicle 3 will be centered by the concave centering elements 11.

In FIG. 4 a schematic drawing of an embodiment of a payload container 2 according to the invention is shown.

Figure 4A:
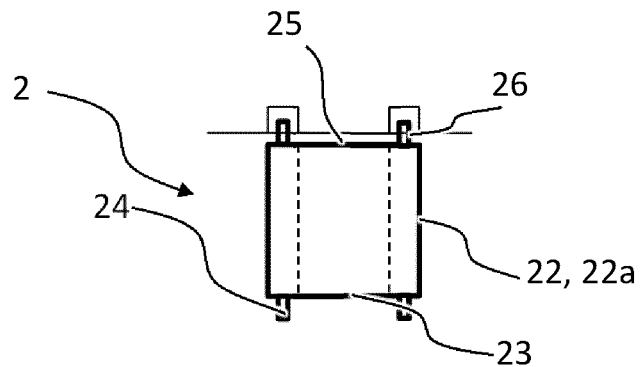
FIG. 4A depicts a first schematic cross-sectional view of a payload container according to the invention.
Figure 4B:
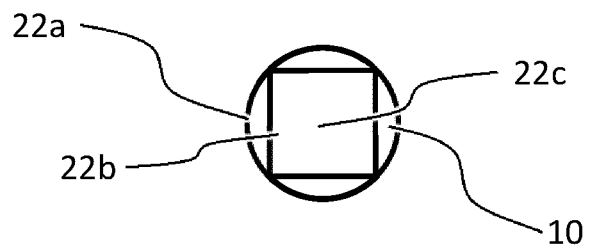
FIG. 4B shows a second schematic cross-sectional view of the payload container of FIG. 4A.

FIG. 4A and FIG. 4B show two orthogonal cross-sectional views of the same payload container 2.

The payload container 2 is essentially cylindrical which provides an aerodynamic outer shape reducing drag along all directions of flight.

Therefore, the outer container wall 22a has a circular cross-section, wherein the inside of the container wall 22b has a rectangular cross-section. In the volume comprised by the outer side of the container wall 22a and the inside of the container wall 22b the rechargeable batteries 10 are arranged. It is possible to also arrange the batteries in the bottom portion 23 of the container 2.

The inner container wall 22b encompasses the container volume 22c, where a payload can be arranged.

On the bottom side 23 of the payload container 2 at least one transport pin 24 but preferably more than one transport pin 24 is arranged, wherein each transport pin 24 is configured to engage with the transport system 6 that comprises corresponding receptacles.

Figure 5:
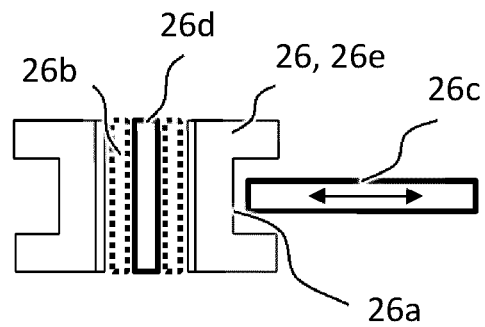
FIG. 5 depicts an exemplary locking mechanism of the unmanned aerial vehicle and the payload container.

The top side 25 the payload container 2 comprises locking pins 26 that are configured to engage with the unmanned aerial vehicle 3. For this reason the unmanned aerial vehicle 3 comprises corresponding receptacles. The locking pins 24 each have a lateral cut 26a out on their side such that the locking device 26c of the unmanned aerial vehicle 3 can engage laterally with the locking pin 26. This is schematically shown in FIG. 5. At least one locking pin 26, but preferably a plurality or all locking pins 26 comprise electrical contacts 26d, 26e for electrically contacting the unmanned aerial vehicle 3 in order to provide the unmanned aerial vehicle with electricity for flight. The unmanned aerial vehicle 3 might nonetheless have its own energy source in order to maintain radio communication and basic functions such as locking and unlocking the locking device 26c.

While the electrical contact 26e can be at ground potential, the electrical contact 26d is a hot contact, i.e. not a ground potential. In order to separate the two electrical contacts, particularly the electrical contact 26d from ground potential, an insulating layer 26b is arranged around the electric contact 26d.

FIG. 5 schematically shows a cross-section through a locking pin 26 with electrical contacts 26d, 26e for the unmanned aerial vehicle 3.

The locking pins 26 each have a lateral cut-out 26a that is designed for receiving a locking device 26c that is laterally engaging with the lateral cut out 26a.

This way a secure attachment to the unmanned aerial vehicle 3 is facilitated.

The locking pins 26 in this example comprise a data cable that can be comprised in the electrical contact 26d. Therefore, the electrical contact 26d is configured to establish a data communication between the battery 10 and the unmanned aerial vehicle 3, such as to provide for example a charging and operating status of the battery 10.

The system according to the invention allows for automatic and autonomous shipping and delivery of payloads, particularly packages, to a landing platform, from where a recipient can pick up the delivery. Moreover, the system allows for automatic shipment of packages from the landing platform to a recipient.

Optionally, the system allows for automatic recharging of the energy source that is comprised in the payload container. The shipment is facilitated by at least one unmanned aerial vehicle, such as a multi-copter. The container is automatically, particularly repeatedly releasably attachable to the unmanned aerial vehicle.

The invention claimed is:

1. An automatic payload shipment system (1) for an unmanned aerial vehicle (3) comprising:
  a) an unmanned aerial vehicle (3),
  b) at least one payload container (2) being configured to be automatically releasably attachable to the unmanned aerial vehicle (3), wherein the payload container (2) has a payload container wall (22) enclosing a payload container volume (22c) for goods (21) or a person, and wherein the payload container wall (22) comprises an energy storage (10) for providing the unmanned aerial vehicle with energy,
  c) a landing platform (4) for the unmanned aerial vehicle (3), the landing platform (4) comprising:
    an elevated landing area (41) accessible by the unmanned aerial vehicle (3) from the air,
    a support post (8) supporting the landing area (41), the support post (8) extending upwards from the ground (101) for providing an elevation for the landing area (41),
    a transport system (6) for automatically transporting the payload container (2) from the landing area (41) to a terminal position (71) at a terminal (7) comprised by the post (8), wherein the terminal (7) is arranged such in the support post (8) that a person on the ground (101) can access the payload container (2) in the terminal position (71) from ground level (101),
    wherein the landing platform (4) further comprises an elevated storage unit (5) for storing a plurality of payload containers (2), wherein the storage unit (5) is supported by the support post (8), wherein the transport system (6) is further configured to automatically transport the payload container (2) from the landing area (41) or the terminal position (71) to a storage position (51) in the storage unit (5), and wherein the landing area (41) and the storage unit (5) are arranged at a height above ground level (101) so that a person cannot reach the landing area (41) or the storage unit (5) when standing on ground level (101).

2. System (1) according to claim 1, wherein the storage unit (5) has a larger circumference than the support post (8) at ground level (101).

3. System according to claim 1, wherein the circumference of the support post (8) at ground level (101) is less than 100 m, 16 m, particularly less than 10 m, particularly less than 6 m.

4. System according to claim 1, wherein the landing area (41) or the storage unit (5) is arranged at a height above ground level (101) of more than 2 m, particularly more than 4 m, more particularly more than 6 m on the support post (8).

5. System according to claim 1, wherein the payload container (2) comprises locking pins (26) opposite the container bottom (23), wherein the locking pins (26) extend from the payload container wall (22), wherein each locking pin (26) has a lateral cutout (26a) for engaging with a locking device (26c) of the unmanned aerial vehicle (3), wherein the unmanned aerial vehicle (3) comprises corresponding recesses for receiving the locking pins (26) and a locking device (26c) that is configured to laterally engage in the lateral cut outs (26a) of the locking pins (26) so as to fix the payload container (2) in a predefined position to the unmanned aerial vehicle (3).

6. System according to claim 1, wherein the payload container wall (22) has a round and aerodynamic, particularly a cylindrical outer contour (22a) for reducing drag during flight.

7. System according to claim 1, wherein the payload container (2) has an opening for fetching and gathering the payload (21), wherein when the payload container (2) is at the terminal position (71) at the terminal (7) the payload container volume (22c) is accessible by a person through the opening of the payload container (2), such that the payload is insertable in the payload container volume (22c) or receivable from the payload container volume (22c), wherein the payload container (2) is non-removably attached to the landing platform (4), particularly to or in the support post (8).

8. System according to claim 1, wherein the payload container (2) has at least one transport pin (24), particularly on its bottom side (23), so that the payload container (2) can be moved by means of engagement to the transport system (6), when the transport pin (24) is engaged in corresponding receptacles of the transport system (6).

9. System according to claim 1, wherein the landing area (41) comprises a centering system for a landed unmanned aerial vehicle, wherein the centering system comprises at least two movable centering elements (11) arranged around an opening (42) in the landing area (41) for receiving the payload container (2), wherein each centering element (11)

comprises a concave receiving portion configured to receive a leg of a landing gear (31) of the unmanned aerial vehicle (3) or to receive a centering protrusion of the unmanned aerial vehicle (3) configured and designed for being received by the centering element (11), wherein each concave centering element (11) faces the opening (42) in the landing area (41), and wherein each centering element (11) is connected to a motor of the centering system configured to move the centering element (11) towards the opening (42) so as to center the unmanned aerial vehicle (3) on the opening (42).

10. System according to claim 9, wherein the centering system comprises three centering elements (11) arranged in a triangle on the landing area (41) and the unmanned aerial vehicle (3) comprises at least three centering protrusions or legs for being received by an associated centering element (11).

11. System according to claim 9, wherein each centering element (11) is arranged on a corresponding guiding track (12) on the landing area (41) along which the corresponding centering element (11) is movable, wherein the corresponding guiding tracks (12) points towards the opening (42) and extend outward from the opening (42) along the landing area (41).

12. System according to claim 1, wherein the landing platform (4) particularly the storage unit (5) comprises at least one charging position (91), particularly a plurality of charging positions (91) for charging the energy source (10) of the payload container (2) located at the charging position (91), wherein the transport system (6) is configured to automatically move the payload container (2) to the at least one charging position (91), wherein the charging position (91) is configured to provide the energy source (10) of the payload container (2) with energy, such as electricity or fuel so as to charge the energy source (10) in the payload container (2).

13. System according to claim 1, wherein the payload container (2) is a passenger cabin for a person, wherein the transport system (1) is configured to transport the cabin to the terminal position (71) at the terminal (7), wherein the terminal (7) is configured such that a passenger can enter or leave the cabin at the terminal (7).

14. Method for aerial shipping of a payload with an unmanned aerial vehicle (3), comprising the steps of:
providing a payload container (2) attached to an unmanned aerial vehicle (3);
landing the unmanned aerial vehicle (3) on an automatic payload shipment system (1) for unmanned aerial vehicles according to claim 1,
automatically releasing the payload container (2),
automatically transporting the payload container (2) to a storage unit (5) of the system (1),
upon request transporting the payload container (2) to the terminal position (71) of the system (1), where a payload container volume (22c) is accessible by a person, wherein the payload container (2) is non-removably bound to the landing platform (4) at the terminal position (71),
particularly automatically transporting the payload container (2) to a charging position (91), where the energy source (10) of the payload container (2) is particularly charged by a charging unit.

15. Method according to claim 14, wherein a payload is provided to the payload container (2) at the terminal (7) by a person, wherein the payload container (2) is subsequently automatically transported to a landed unmanned aerial vehicle (3) and wherein said payload container (2) is automatically attached to said unmanned aerial vehicle (3).

\* \* \* \* \*